United States Patent Office 3,540,282
Patented Nov. 17, 1970

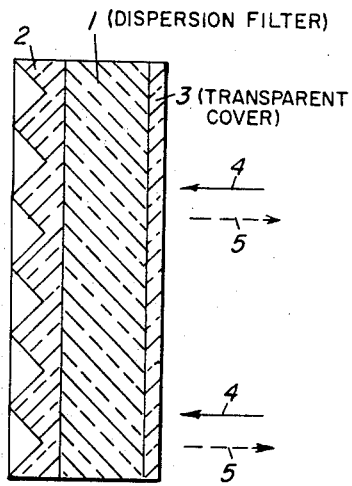
FIG. 1
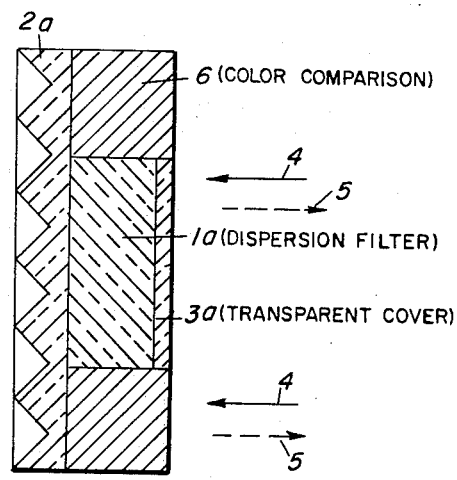
FIG. 2
FIG. 3
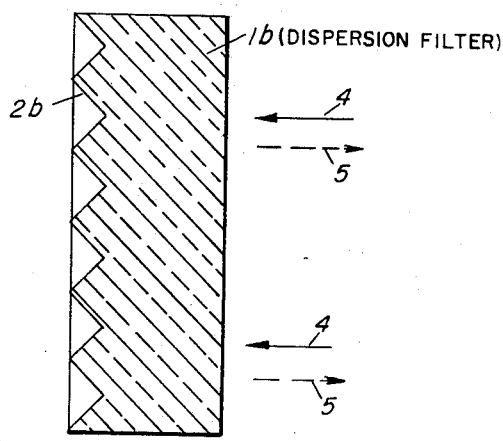
FIG. 4
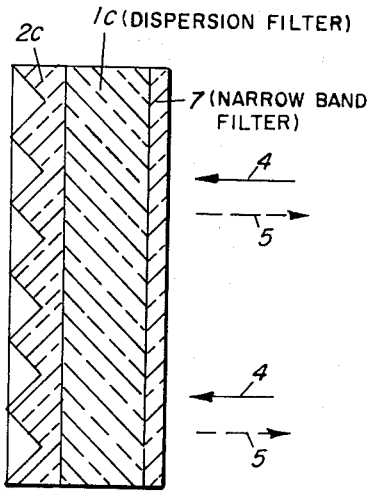
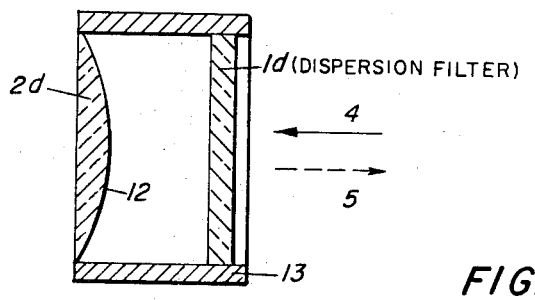
FIG. 5
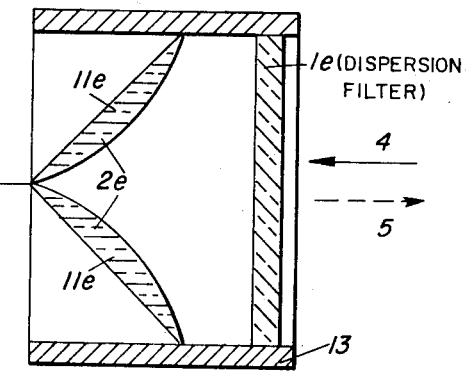
FIG. 6

3,540,282
DEVICE FOR ALERTING A MOTORIST TO THE DANGER OF ICED ROADS
Wolfgang Köhler, Alzenau, and Reinhard Fischer, Mosbach Kreis Dieburg, Germany, assignors to Wolfgang Dabisch, Eltville (Rhine), Germany
Filed May 15, 1967, Ser. No. 638,259
Claims priority, application Germany, May 17, 1966, B 87,158
Int. Cl. G01k 11/12
U.S. Cl. 73—356                 9 Claims

ABSTRACT OF THE DISCLOSURE

A road sign to warn motorists against freezing conditions carries a temperature sensitive optical filter with reflector. At freezing temperature, the light of the headlights passing through the filter is reflected by the reflector towards the motorist in a different color.

This invention relates to a device for alerting a motorist to the danger of iced roads.

At present, experiments are made with warning devices which measure the temperature and air moisture near the roads and, on the basis of such measurements, indicate the possibility of ice formation on the road surface. In order to transmit such warning signals, the devices require electrical energy, and they must be connected by means of electric conduits to a current supply. Due to the high purchasing and installation cost, such warning devices can be employed only at particularly exposed locations, i.e. at underpasses or bridges.

It is, therefore, a principal object of this invention to provide a device which does not require energy supply and which is cheap enough for installation at or in any kind of road border, e.g. at posts defining the boundary line of the roadway.

For determining the danger of ice formation on a road, determination of the temperature in the freezing range is sufficient. This is true particularly when a temperature drop in the traveling direction of the vehicle has to be optically indicated.

The invention consists, therefore, in installing on boundary stones or posts placed along the highway, additionally to the reflectors, optical temperature sensors. Such sensors render visible, at least at night in the light of the head lights, the atmospheric temperature and particularly any temperature changes.

The optical effect utilized for this purpose is the temperature sensitivity of the spectral peak of dispersion filters, also called Christiansen filters. By a suitable selection of the refractive indices of the filter components, said sensitivity can be so adjusted as to produce, when approaching freezing temperature, a color change from green over yellow to red. If such filters are, for example, backed by triple-mirror reflectors or formed themselves as reflecting triple-mirrors, said color change can be readily observed in the light of headlamps. By reducing the dispersion difference of the components of the dispersion filter, its color change range can be restricted to about 2–3° C.; this means that for temperature changes of 2–3° C., the peak changes from green to red.

The observation of the color change can be improved by providing in the filter zone colored triple-mirror reflectors whose color corresponds to that of the filters at about 0° or 0.5° C. The color difference between reflectors and filters can then be securely perceived at great distances and provides for a more precise determination of the temperature than the visual determination of absolute color values without such possibility of a comparison.

In a further embodiment of the inventive concept, the dispersion filters are provided, in the direction of the incident light, additionally with narrow cut filters ("Kantenfilter") of completely colored glass. When the spectral transmittance of such filter is selected to correspond to the spectral transmittance of the dispersion filter at temperatures around 0° C. and below, the reflectors become effective only at said temperatures. In this way, ice warning signs can be built which reflect only at temperatures of about below 0.5° C. but which are black at higher temperatures, e.g., a warning inscription can be produced which flashes only when there is danger of icing so as to call attention to such danger.

The efficiency of the device of the invention can be further increased by a special design of the reflectors used in combination with the dispersion filters. When warning signs for ice formation on the road surfaces are spaced at intervals of about 40 to 100 m., it is of advantage to use as reflector a convex mirror with a focal length of 2 to 4 m. whereby the optical axis of said mirror bisects the angle formed by the headlight, the convex mirror, and the head of the driver. In this way, the reflected light beam diverges just so far as to cover, at the recited distance, both eyes of the driver. At smaller focal length, the angular range in which the reflected light can be seen, becomes greater but its intensity is no longer sufficient to ensure recognition of the colors. An adjustment of the convex mirror in the described manner is recommended because the light of the head lamps is reflected into the eyes of the driver only then when the optical axis of the convex mirror bisects the angle defined hereinabove. Said adjustment ensures that the reflected light beam can be observed for a sufficiently long stretch of travel.

According to another embodiment of the invention, a similar effect can be obtained by designing the reflector as two plane mirrors arranged at an angle of 90° with respect to each other in such a manner that the incident head light beam is reflected into the direction of incidence in a substantially horizontal plane. By using in this arrangement convex mirrors of large focal width, the reflected light beam can be made somewhat divergent. In this way, it is easier to ensure that, irrespective of the type of vehicle, truck or passenger car, and independently of the level of the driver's seat, the reflected light strikes the eyes of the driver within a sufficiently long stretch of the road when the vehicle travels toward the reflector.

The foregoing and other objects, features, and advantages of the invention will be apparent from the following more particular description of some preferred embodiments of the invention, as illustrated in the accompanying drawings in which like elements are indicated by the same numerals.

In the drawings,

FIGS. 1–6 are sectional views of warning signs according to the invention, and

Figure 7:
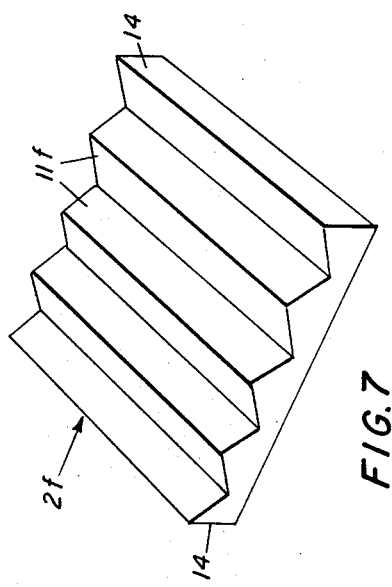
FIG. 7 is a schematic perspective view of a modified sign according to FIG. 6.

In FIG. 1 is shown a dispersion filter 1 backed by a reflector 2 which, in this embodiment, is designed as a triple mirror. In the incident direction of the light, the dispersion filter 1 is protected against external injury by a transparent cover plate 3.

If the filter components of the dispersion filter 1 are so adjusted that, when the ambient temperature approaches the freezing point, a color change takes place from green over yellow to red, the beam of the head lights which is incident in the direction of the arrow 4 shown in full, is reflected red-colored in the direction of the broken arrow 5. In this way, a temperature approaching the freezing point and therefore the risk of ice formation on the road is optically indicated.

In order to render the color change better observable, the dispersion filter 1a can be surrounded by a colored comparison body 6, e.g., of colored glass, as shown in FIG. 2. Preferably, said comparative body is also backed by a reflector 2a or designed as an auxiliary reflector and protected by transparent cover 3a. The color of the comparative body 6 must, during the color change, be readily distinguishable from the color of the dispersion filter 1a so as to ensure a comparison for a better recognition of the transition point.

A device in which the rear wall of the dispersion filter 1b itself forms the reflector 2b is shown in FIG. 3.

FIG. 4 depicts a device of the character described in which an optical narrow band filter 7 is arranged in front of the dispersion filter 1c. The spectral transmittance of said filter 7 is so selected as to correspond to the spectral transmittance of the dispersion filter 1c at temperatures around 0° C. and below. Therefore, the reflector 2c becomes effective only at said temperatures. In this way, warning signs can be produced which become visible only under freezing conditions and call attention to the danger of ice on the road surfaces.

Dispersion filters can be made essentially in two modifications. In the one case, powdered glass can be dispersed in a liquid; in the other case powdered glass is incorporated in a solid polymer. In either case, a layer of about 2–6 mm. thickness is sufficient.

FIGS. 5 and 6 show reflectors which provide for a greater efficiency than the embodiments of FIGS. 1–4.

According to FIG. 5, the reflector 2d is designed as a convex mirror 10 and the dispersion filter is indicated at 1d. The side 12 facing the arrow 4 is metallized and therefore acts as a reflector. For road traffic in danger of icing surfaces observation posts should be spaced at intervals of about 40 to 100 m. and said convex mirrors should have a focal length of about 2 to 4 m. Under these conditions, the reflected light beam diverges just sufficiently to cover both eyes of the observer.

Figure 8:
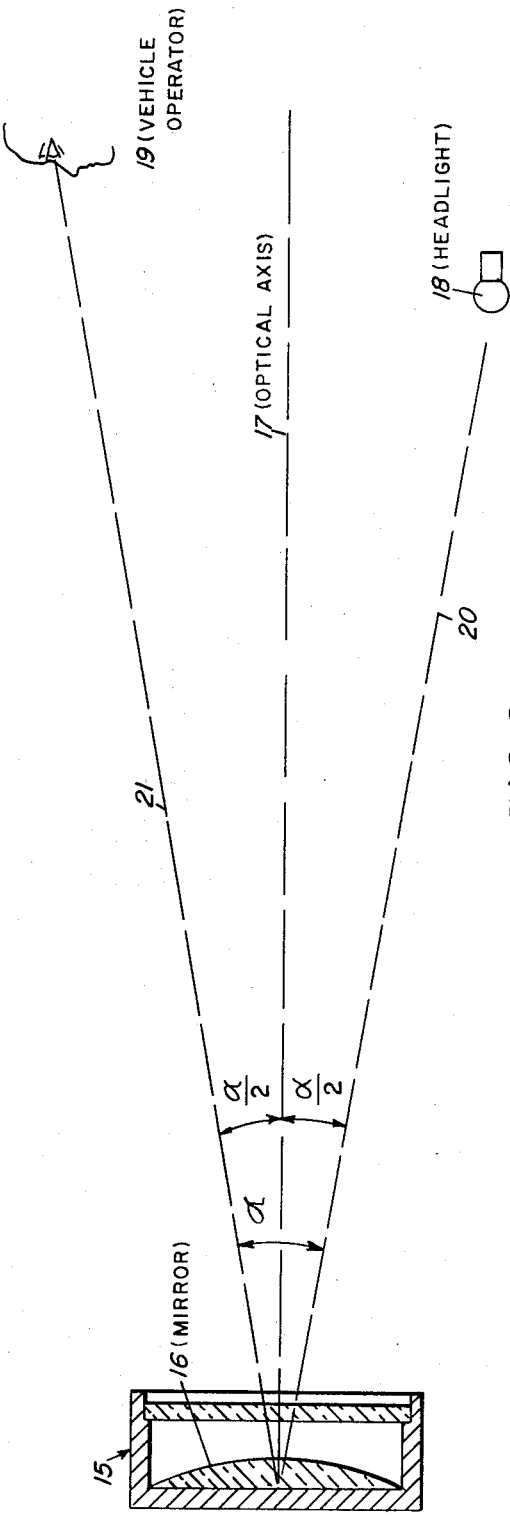
FIG. 8 is a diagram of the path followed by light from the headlights of a vehicle approaching a sign constructed in accordance with this invention.

FIG. 6 shows a reflector formed by plane mirrors 11e which enclose a right angle with each other and are so arranged that the incident light is reflected substantially in a horizontal plane into the direction of incidence and can, therefore, be perceived. When said plane mirrors 11e are made convex with a great focal distance, also of about 2 to 4 m. the reflected light beam also in this arrangement made can be made somewhat divergent; in this simple manner, the reflected colored light can be observed by the driver along a sufficient length of his travel irrespective of the level of his seat and of the type of vehicle whose head lights illuminate the warning device. This is illustrated diagrammatically in FIG. 8, wherein numeral 15 indicates a reflective warning sign constructed in accordance with this invention, provided with a mirror 16, whose optical axis is indicated by numeral 17. The light from the headlight 18 of the vehicle driven by operator 19 follows the path 20 and 21. The convex arrangement of the plane mirrors 11e is shown exaggerated in broken lines in FIG. 6.

In the devices of FIGS. 5 and 6, the dispersion filters 1d and 1e and the reflectors 2d and 2e are arranged in a housing 13.

FIG. 7 shows a modification of the reflector of FIG. 6. Said reflector is composed of arranging a plurality of pairs of plane mirrors 11f in such a way that the mirrors of each pair are at right angles to each other. The reflector 2f of FIG. 7 must be inserted in the warning device in such a manner that the edges 14 extend one above the other substantially in horizontal direction parallel to the bottom wall. The same applies to the device of FIG. 6.

Some compositions for dispersion filters 1 providing a color change in the temperature range of 0 to 6° C. will now be given, these examples being, however, not to be considered as limitative in any way.

EXAMPLE 1

Solid phase: Powder of the optical glass BK7 of Schott & Gen., Mayence, Germany.

Liquid phase: Tetrachloroethylene ($Cl_2C:CCl_2$).

EXAMPLE 2

Solid phase: Powder of optical glass Ba LK1.

Liquid phase: Methylbenzoate ($C_6H_5COOCH_3$).

We claim:

1. A temperature responsive device for warning operators of vehicles on highways of icing conditions to be disposed in the path of the headlights of a vehicle, comprising temperature sensitive optical dispersion filter means changing color in the freezing point range, triple-mirror direction-reversing reflector means, means for mounting said dispersion filter means between said direction-reversing reflector means and incident light from said source, whereby all of the incident light received by the reflector means from said source will be returned toward said source through said dispersion filter means and the color of said returned light will be dependent on the temperature of said dispersion filter means for indicating the probability of icing conditions.

2. The device as claimed in claim 1 wherein said reflector means is formed integrally with said dispersion filter means.

3. The device as claimed in claim 1 wherein said dispersion filter means is provided, in the direction of the incident light, with a narrow band filter.

4. A temperature responsive warning device to be disposed in the path of an incident headlight beam of an automobile, comprising direction-reversing reflector means, said reflector means being a diverging mirror whose optical axis bisects the angle formed by said incident headlight beam, said diverging mirror, and the head of the driver of the automobile, temperature sensitive optical dispersion filter means changing color in the freezing point range, means for mounting said dispersion filter means between said direction-reversing reflector means and incident light from said source, whereby all of the incident light received from said source will be returned toward said source through said dispersion filter means and the color of said returned light will be dependent on the temperature of said dispersion filter means for indicating icing conditions.

5. The device as claimed in claim 4 wherein said diverging mirror has a focal length of 2 to 4 meters.

6. The device as claimed in claim 5 wherein said reflector means is formed by two plane mirrors arranged at an angle of 90° with respect to each other so as to reflect an incident headlight beam in a substantially horizontal plane into the direction of incidence.

7. The device as claimed in claim 6 wherein said plane mirrors have a convex design.

8. A temperature responsive warning device to be disposed in the path of a source of light, comprising direction-reversing reflector means, temperature sensitive optical dispersion filter means changing color in the freezing point range, means for mounting said dispersion filter means between said direction-reversing reflector means and incident light from said source, whereby all of the incident light received from said source will be returned toward said source through said dispersion filter means and the color of said returned light will be dependent on the temperature of said dispersion filter means for indicating icing conditions, said dispersion filter means being provided with a protective transparent cover plate on the side toward said source of light, the reflector means being positioned on the other side of said dispersion filter means, said reflector means comprising at least one pair of complementary plane mirrors arranged to return incident light in substantially the direction from which said incident light is transmitted.

9. The device as claimed in claim 8, wherein a transparent body having a predetermined color is positioned adjacent said dispersion filter means in the path of said incident light to provide a comparison color.

References Cited

UNITED STATES PATENTS

| | | | |
|---|---|---|---|
| 2,991,698 | 7/1961 | Leubaz | 94—1.5 |
| 3,343,467 | 9/1967 | Bonvallet | 94—1.5 |
| 1,013,937 | 1/1912 | Hatt | 350—312 |
| 2,012,933 | 8/1935 | Davidson | 240—8.3 |
| 2,102,975 | 12/1937 | Rolph | 240—8.3 |
| 2,710,274 | 6/1955 | Kuehl | 350—160 X |
| 3,046,473 | 7/1962 | Kessler et al. | 350—312 X |

FOREIGN PATENTS 478,140  1/1938  Great Britain.

OTHER REFERENCES

Publication: "Temperaturemassung Mittels Dispersons Filter," by V. W. Kohler and R. Fisher, pp. 624–629 of "Optik," vol. 21, No. 11., November 1964. A copy may be found in 350—312.

LOUIS R. PRINCE, Primary Examiner

D. M. YASICH, Assistant Examiner

U.S. Cl. X.R.

94—1.5; 350—160